Jan. 22, 1946.  R. H. WOLF  2,393,491
CANNING DEVICE
Filed Dec. 8, 1944  2 Sheets-Sheet 1
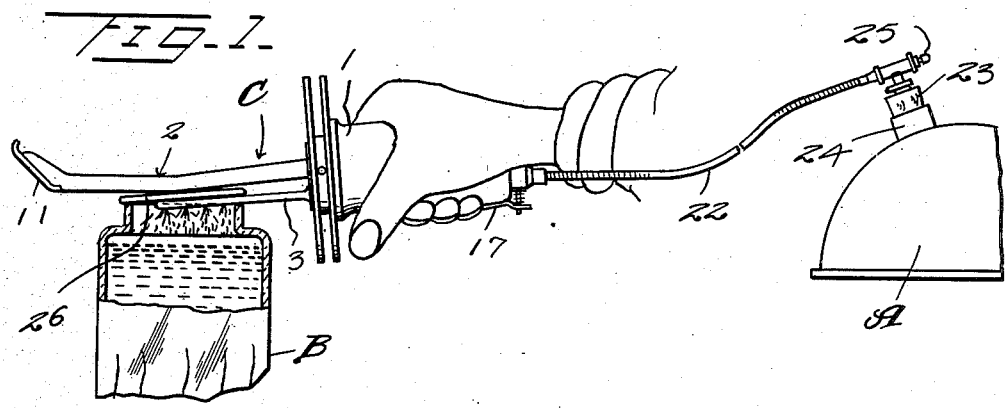
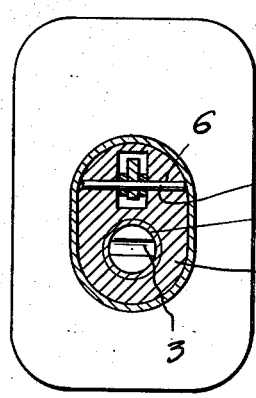
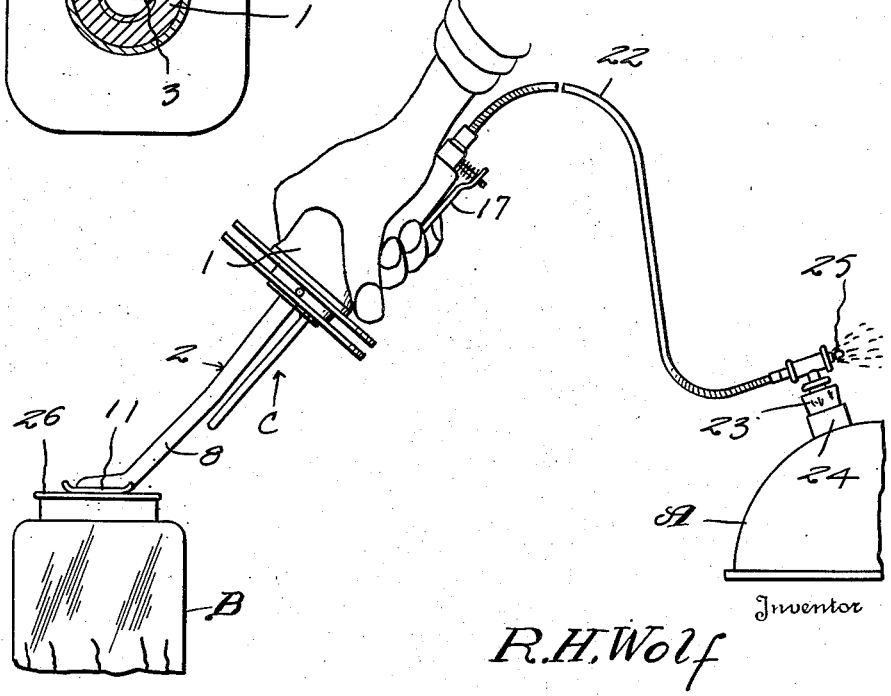
Inventor
R. H. Wolf

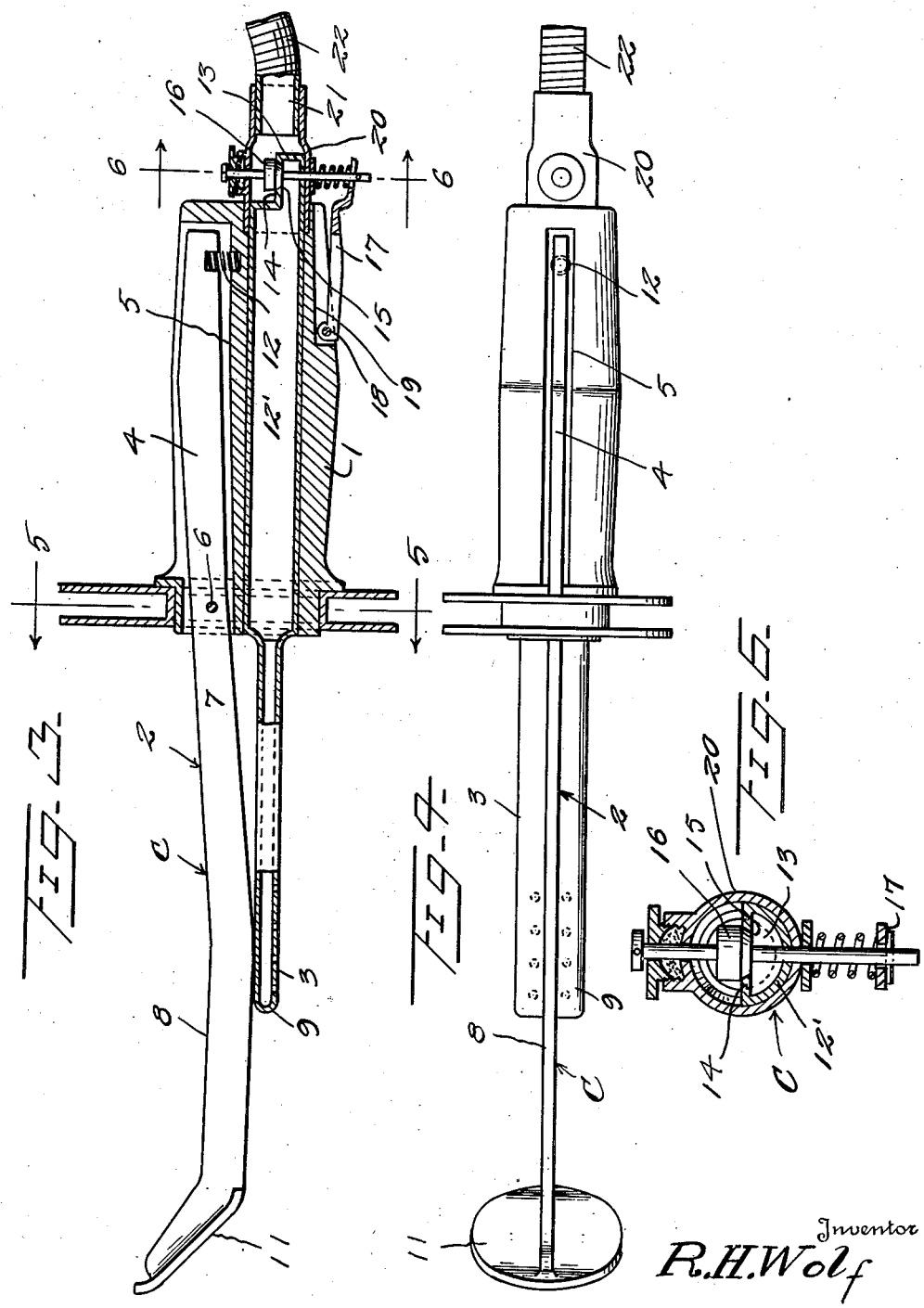

Patented Jan. 22, 1946

2,393,491

UNITED STATES PATENT OFFICE 2,393,491

CANNING DEVICE

Richard H. Wolf, Gary, Ind.

Application December 8, 1944, Serial No. 567,300

3 Claims. (Cl. 226—82)

This invention relates generally to canning apparatus, and more especially to a device for sterilizing and closing glass jars containing fruit or vegetables to be preserved.

One object of my invention is to provide a canning device of the character specified in which a vacuum may be created in the glass container in carrying out the process.

A further object of my invention is to provide a canning device with a novel clamping arm and nozzle and means whereby the lid may be clamped between the clamping arm and nozzle and held in proper position on the rim of the jar while the steam is applied directly on top of the open glass jar just filled with fruit or vegetables brought to the boiling point.

A still further object of my invention is to provide a canning device of the character specified with a valve and spring actuated arm for controlling the flow of the steam through the nozzle and whereby the flow of the steam may be cut off instantly after it has been applied to the glass jar for a sufficient length of time.

Still another object of my invention in to provide the clamping arm with a novel clamping foot, whereby the final step in the sealing of the lid on the jar may be accomplished with a minimum of exertion and in a most convenient and practical manner.

Still another object of my invention is to provide the handle of the device with a protecting shield that will prevent possible burning of the hand during the one minute release or application of the steam to the top of the jar.

With the foregoing and other objects in view that will appear as the nature of my invention is better understood, the same consists in the novel features of construction, combination and arrangement of parts illustrated in the accompanying drawings and more particularly pointed out in the appended claims.

In the accompanying drawings, which are for illustrative purposes only and are therefore not drawn to scale:

Figure 1 is a diagrammatic view, illustrating the first step in the application of my invention.

Figure 2 is a similar view, showing the final step in the sealing of the lid on the jar.

Figure 3 is a side elevation, partly in section, of my improved canning device.

Figure 4 is a plan view.

Figure 5 is a vertical transverse section, taken on line 5—5 of Figure 3, and Figure 6 is a detail view of the control valve mechanism.

Referring to the drawings for a more particular description of my invention, and in which drawings like parts are designated by like reference characters throughout the several views, A designates a water or tea kettle of any ordinary or approved type, B a glass jar used in preserving fruit or vegetables and C my improved canning device, as a whole.

Specifically, my canning device comprises the elongated handle 1, which carries the pressure arm 2 and nozzle 3. The pressure arm 2 is in the form of a flat elongated metal bar, whose inner end 4 extends into a corresponding longitudinal recess 5 in the upper portion of the handle, and is pivoted, as at 6, by means of the transverse pin 7 or other equivalent means, to the inner end of the former. The outer end 8 of the pressure arm 2 extends directly over and beyond, and normally bears against, the corresponding flat perforated end 9 of the nozzle 3. The extreme outer end 10 of the pressure arm is provided with the upwardly inclined transversely disposed elliptical pressure foot 11, which is disposed at an angle of approximately forty-five degrees with the latter. The outer end 8 of the pressure arm 2 is normally held at the desired pressure against the nozzle or lid, as the case may be, by the coil spring 12, mounted in the handle 1 and bearing against the bottom edge and inner end 4 of said arm.

Steam is conducted to the perforated nozzle 3 by means of the tube 12' extending longitudinally through the bottom portion of the handle 1 and cast integral with or otherwise connected to the inner end of the nozzle.

In carrying out my invention, the inner end of the tube 12 is provided with the offset portion 13, which extends beyond the adjacent end of the handle 1. The top wall 14 of the offset portion 13 is formed with a steam inlet port or opening 15, on which is normally seated the valve 16. The valve 16 is normally held in closed position by the spring controlled arm 17, pivoted at one end, as at 18, to the bottom of the handle 1 and working in a corresponding longitudinal recess 19 formed therein. A sleeve 20 encompasses the offset portion of the tube 12 and the valve 16 and the free end of this sleeve is connected to the adjacent end, as 21, of the flexible tube 22. The opposite end of the flexible tube 22 is provided with a tapering plug 23 of wood, cork, or other suitable material adapted to be inserted in the opening or spout 24 of an ordinary water or tea kettle A. The end of the flexible tube connected to the water or tea kettle is also provided with a safety valve 25, the purpose of which will be apparent.

In practice, the operator first slides the lid 26 of the jar about one and one-half inches between the outer end 8 of the pressure arm 2 and the free end of the nozzle 3, when the lid will be clamped in place by the action of the coil spring 12. One edge of the lid 26 with the sealing applied, is then placed on the rim of the jar, as illustrated in Figure 1 of the drawings, and the steam then released and applied through the medium of the perforated nozzle 3 directly to the open top of the glass jar, by pressing on the spring controlled arm 17. After the steam has been applied to the top of the jar for one minute, the arm 17 is released, and the supply of steam will be cut off instantly by the valve 16. The nozzle 3 is then pulled out of the jar, during which operation the pressure arm 2 will hold the lid on the rim of the jar. The final step is to raise the handle 1 until the pressure foot 11 rests flatwise on the top of the lid, and then press down slightly, when the jar will be sealed.

Among the many advantages to be derived through the use of my invention, some of the more important may be briefly enumerated as follows:

First: It is only necessary to bring the fruit to the boiling point, which greatly shortens the preserving time.

Second: The vitamins and flavor of the goods are saved.

Third: Only one minute is needed to close and seal the jar.

Fourth: An opened jar with part of its contents removed can be closed again when a new lid is used.

Fifth: Any jar with smooth edge can be used when lids are available.

Sixth: No special cooking utensils are necessary; any stainless or enameled pot can be used for preparing the fruit or vegetables.

Seventh: No zinc band to screw over the lid is necessary.

Eighth: No rubber rings are used.

Ninth: Fuel is saved.

Tenth: An inexpensive canning device is provided within the reach of every one.

The outer end of the handle 1 may be provided with a protecting shield 27, which will prevent burning of the hand during the release and application of the steam to the jar.

From the foregoing description taken in connection with the drawings, it is thought that the construction, operation and advantages of my invention will be readily understood, without requiring a more extended explanation.

Having described my invention, what I claim as new and desire to secure by Letters Patent is:

1. A canning device of the character specified, comprising a handle, a pressure arm pivoted to one end of said handle, a perforated steam nozzle disposed directly under and in contact with the outer end of the pressure arm, a tube extending longitudinally through the handle and connected to said nozzle and a steam controlling valve in said tube.

2. A canning device of the character specified, comprising a handle, a pressure arm pivoted at one end to said handle, a perforated steam nozzle disposed directly under and in contact with the outer end of the pressure arm, a steam pipe or tube extending longitudinally through the handle and communicating with the adjacent end of the nozzle, a steam controlling valve in said pipe or tube and a protective shield carried by the outer end of the handle.

3. A canning device of the character specified, comprising a handle, a pressure arm, pivoted at one end to said handle, a perforated steam nozzle disposed directly under and in contact with the outer end of the pressure arm, a pressure foot at the outer end of the pressure arm, a spring for exerting pressure on the outer end of the pressure arm, a tube extending longitudinally through the handle and communicating with the adjacent end of the nozzle and means including a flexible tube for connecting the inlet end of the steam tube with the spout of a water or tea kettle.

RICHARD H. WOLF.